United States Patent [19]
Alexander

[11] Patent Number: 5,505,575
[45] Date of Patent: Apr. 9, 1996

[54] PIT MOUNTED RETRACTABLE VEHICLE RESTRAINT

[75] Inventor: James C. Alexander, London, Canada

[73] Assignee: United Dominion Ind., Inc., Charlotte, N.C.

[21] Appl. No.: 301,647

[22] Filed: Sep. 7, 1994

[51] Int. Cl.⁶ .................................................. B65G 69/00
[52] U.S. Cl. ............................................ 414/401; 414/584
[58] Field of Search ................................. 414/396, 401, 414/402, 584

[56] References Cited

U.S. PATENT DOCUMENTS

| | | | |
|---|---|---|---|
| 4,488,325 | 12/1984 | Bennett et al. | 414/401 X |
| 4,555,211 | 11/1985 | Metz | 414/401 |
| 4,560,315 | 12/1985 | Hahn | 414/401 |
| 4,674,941 | 6/1987 | Hageman | 414/401 |
| 4,695,216 | 9/1987 | Erlandsson | 414/401 |
| 4,830,563 | 5/1989 | Yeakle | 414/401 |
| 4,938,647 | 7/1990 | Erlandsson | 414/401 |
| 5,096,359 | 3/1992 | Alexander | 414/584 X |
| 5,203,663 | 4/1993 | Ruppe | 414/401 |
| 5,212,846 | 5/1993 | Hahn | 414/401 X |
| 5,336,033 | 8/1994 | Alexander | 414/396 X |

OTHER PUBLICATIONS

Powerhook II Truck Restraint, p. 10 of Poweramp brochure dated Feb. 1991.

*Primary Examiner*—Michael S. Huppert
*Assistant Examiner*—James W. Keenan
*Attorney, Agent, or Firm*—Sughrue, Mion, Zinn, Macpeak & Seas

[57] ABSTRACT

Apparatus used in a loading dock comprising a dock leveler mounted at the loading dock with a pit positioned below said dock leveler. A frame is mounted in the pit to support a vehicle restraint. The restraint has an arm assembly mounted to said frame for pivoting motion and a hook assembly having multiple hook elements mounted on the arm assembly and outward from the frame. A first actuator is mounted to the frame and engaging the arm assembly to drive both the arm assembly and the hook assembly to a lower inoperative position. A second actuator is mounted to the first actuator and the arm assembly to provide a constant upward bias tending to pivot the arm assembly and the hook assembly upward to an operative position.

20 Claims, 8 Drawing Sheets

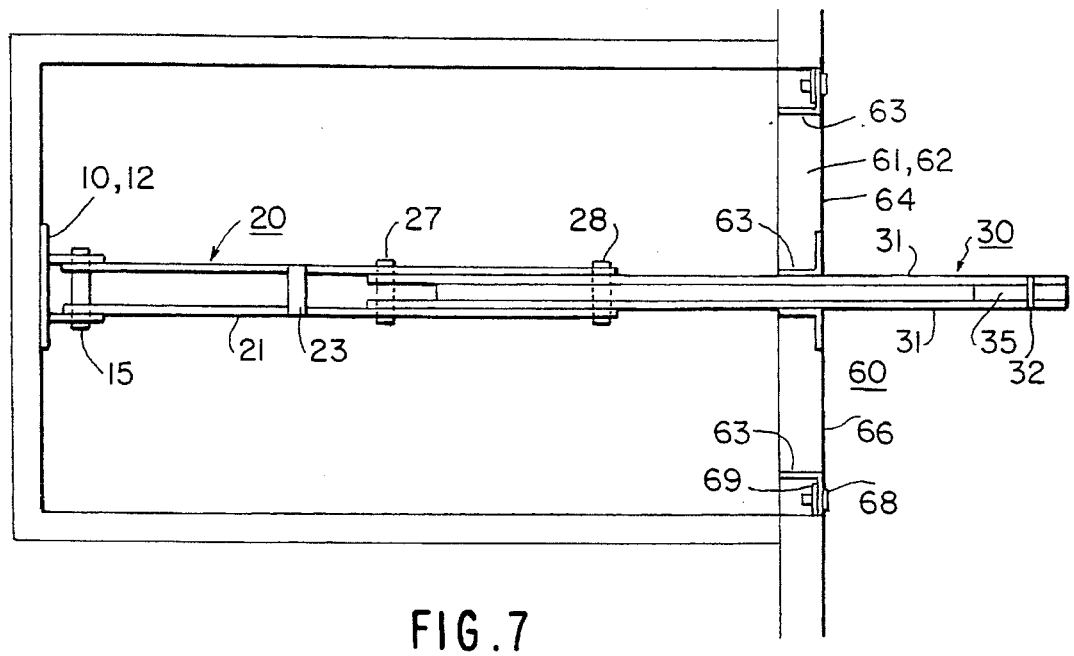
FIG.7
FIG.8
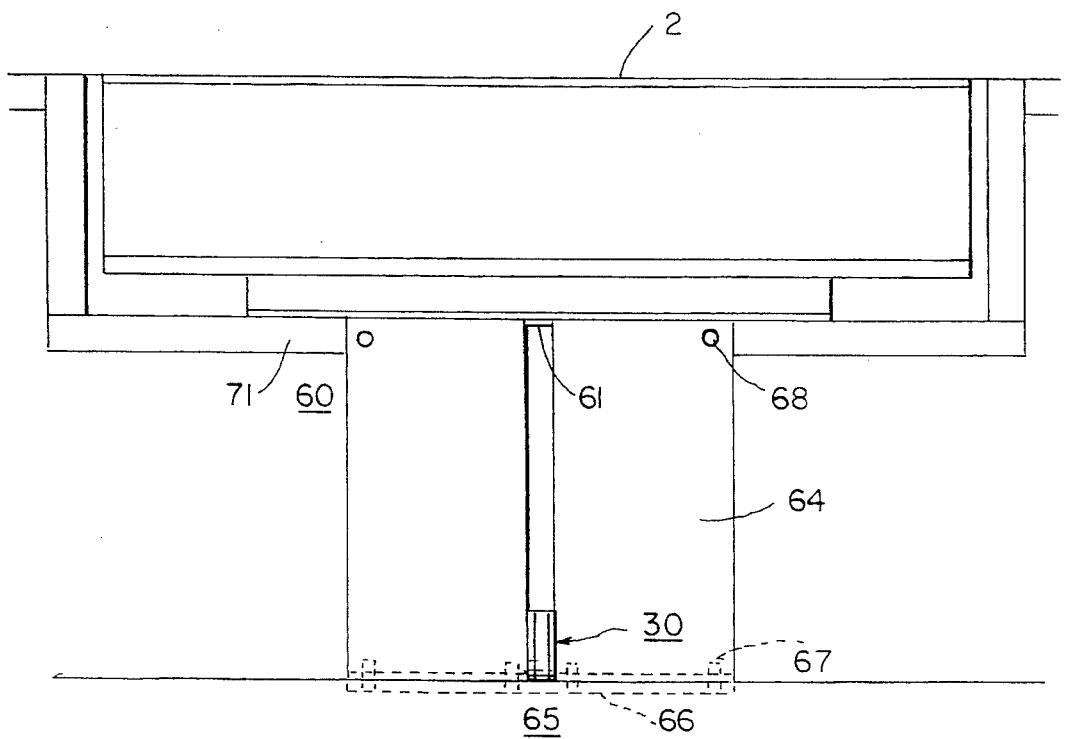

PIT MOUNTED RETRACTABLE VEHICLE RESTRAINT

BACKGROUND OF THE INVENTION

This invention relates to a vehicle restraint used to secure a truck to a loading dock. Such devices are well established in the loading dock industry. In general, these devices act as a substitute for chains and wheel chocks. A common trait is that they all employ the ICC bar of the vehicle as the means by which the vehicle is engaged and restrained. ICC bars are required by law and are placed at the rear end of the vehicle within a specified height and distance above the ground and from the rear of the vehicle. Consequently there is a limited "envelope" in which engagement with the ICC bar can take place.

Most vehicle restraints mount directly to the dock face. Typical is that illustrated in U.S. Pat. Nos. 4,264,259 and 4,695,216.

Others are mounted on the approach adjacent the dock face. Such is illustrated in U.S. Pat. No. 4,674,941. Still others, as typified by U.S. Pat. No. 5,120,181 can be mounted alternatively on the dock face or on the approach.

A third category of mounting is such where the vehicle restraint is mounted in a pit under the dock leveler, such as the "Power Hook II" device manufactured by Power Ramp or, the restraint is housed in a hole dug under the approach, as illustrated in U.S. Pat. No. 5,212,846.

Mounting the vehicle restraint in front of the dock leveler, whether to the dock face or onto the approach is less expensive than constructing an additional pit either under the dock leveler or in the approach sub-surface itself. However, mounting the vehicle restraint under the dock leveler has several important advantages.

First, a hook which can be mounted at the end of a long pivoting arm will travel essentially in a vertical motion without the need for complex tracks, rollers or other mechanical linkages. The ability to move in an essential vertical direction allows the restraint to capture a large number of ICC bars without binding, or becoming interlocked as the vehicle floats up and down during loading and unloading operations.

Moreover, a simple pivoting hook can have a lower height, it does not require a bulky housing and thus can reach lower ICC bars than other mechanisms. For example, a device as such as that illustrated in U.S. Pat. No. 4,674,941, even in the retracted position, has a fundamental height associated with the mechanism. A low ICC bar might impinge that mechanism in its "at rest" position thus, preventing raising and engagement, or preventing the vehicle from approaching the dock.

A hook can also be made to retract back into the pit. Having the dock face and approach clean, without any mechanical impediments, is important to allow for the removal of snow and ice, which would otherwise impede the operation of the vehicle restraint. A hook that can retract under the dock leveler is not only protected from ice and snow but presents no obstacles to interfere with snow removal. It is also important to allow the dock to be used by vehicles having special equipment, such as a hydraulic elevating tail gate. Conventional vehicle restraints mounted to the dock face may prevent such vehicles from approaching the dock.

Pit mounted vehicle restraints utilizing retractable hooks are known ("Power Hook II"). However, the restraining force in those units is carried by hydraulic cylinders. That is, the technique of extension and retraction is via hydraulics. This makes such units expensive and requires them to be used in conjunction with an hydraulic dock leveler.

Moreover, the pit for the vehicle restraint will also collect dust debris and is generally hard to clean.

SUMMARY OF THE INVENTION

Given the deficiencies in the prior art, it is an object of this invention to provide a vehicle restraint which is not tied to hydraulic operation and has restraining loads carried entirely by mechanical components.

A further object of this invention is to provide a vehicle restraint that eliminates the draw backs of the prior art and is housed in a pit under a dock leveler.

Yet another object of this invention is to provide for a vehicle restraint which has multiple hooking positions for the purpose of minimizing "running room" of the trailer ICC bar as the vehicle tends to move away from the loading dock during loading and unloading operations.

A still further object of this invention is to provide for a vehicle restraint that allows the unit to be covered in a pit that thereby prevents entry of debris but allows for easy servicing and cleaning of the unit.

These and other objects of this invention are accomplished by means of a vehicle restraint which is mounted under a dock leveler. The vehicle restraint can be either mounted at driveway level, or in a pit which is further recessed such that a portion of the unit is in fact positioned in its stored position below driveway level.

The unit comprises a pair of hooking arm members which are extensible outward from their stored position in the pit and are capable of being rotated upward to engage a vehicle ICC bar. The hooks which are employed comprise a primary hook and a secondary hook which are used to engage the ICC bar and thus minimize outward motion.

This invention will be described in greater detail by referring to the drawing and the description of the preferred embodiment which follows.

BRIEF DESCRIPTION OF THE DRAWING

FIG. 7 is a top view of the vehicle restraint showing the nesting of the two elements within the arm assembly;

FIG. 8 is a front view showing the relationship of the unit to the dock leveler and the front cover plate;

DESCRIPTION OF THE PREFERRED EMBODIMENTS

Figure 1:
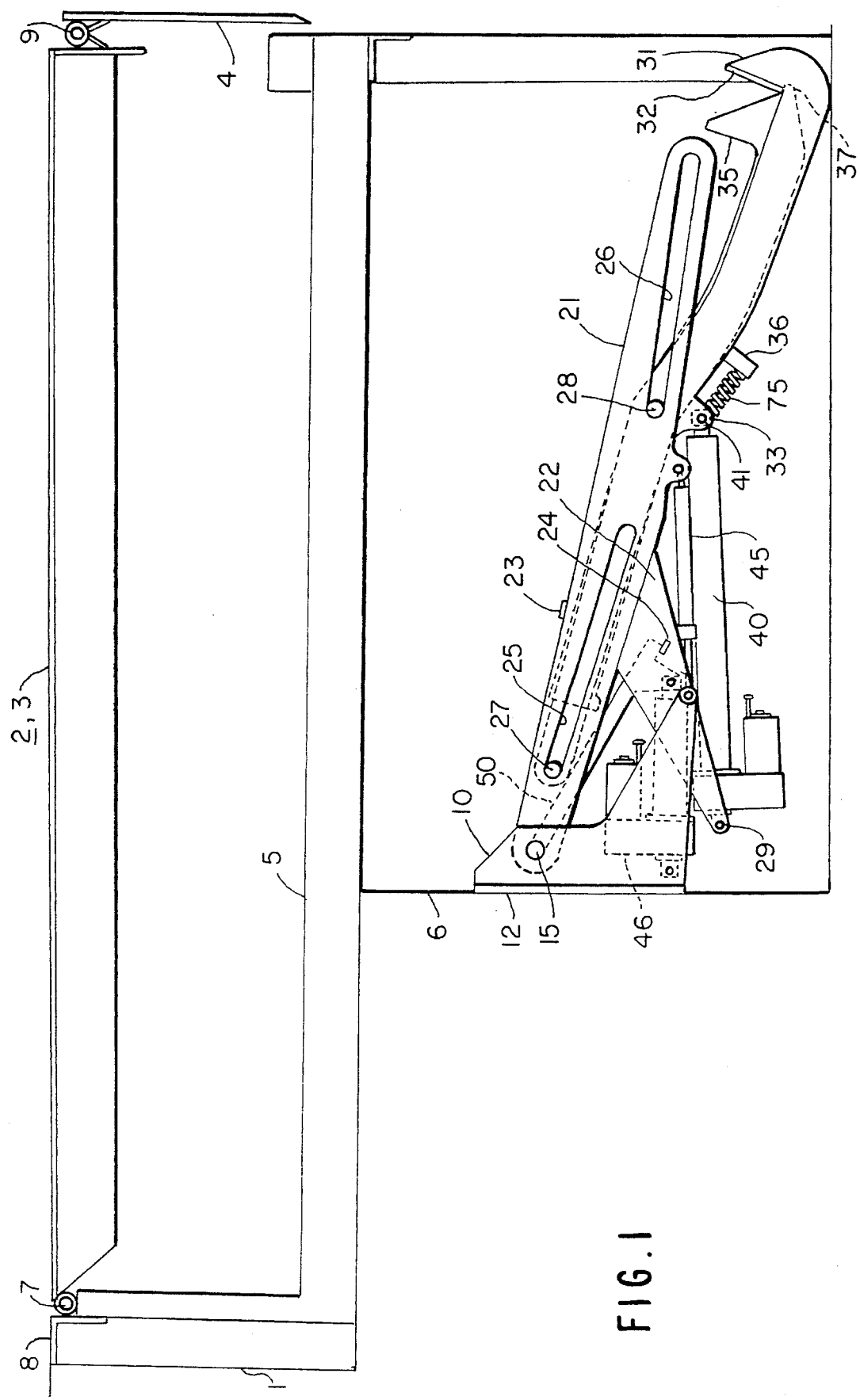
FIG. 1 is a sideview showing the installation of a preferred embodiment of this invention beneath a dock leveler.

Referring now to FIG. 1, a dock leveler installation in accordance with this invention is depicted. The dock leveler assembly 2 is installed in a recess pit 1. The dock leveler comprises a deck assembly 3, a pivoting lip 4, and a frame assembly 5. The deck assembly 3 pivots on the frame 5 at a pivot point 7. The frame itself is coupled to the pit by means of reinforcing elements 8. The pivoting lip 4 pivots on the deck assembly 3 by a pivot 9.

Such dock levelers and those rudimentary elements are fundamentally well known and are illustrated in the figures for showing the relationship of that dock installation to the vehicle restraint portion of this invention. It will be appreciated that different types of dock levelers can be used in conjunction with the vehicle restraint. Such levelers may have different framing from that depicted or store vertically.

Under the leveler pit the vehicle restraint pit is positioned. That is, as illustrated in FIG. 1 the deck assembly 3 is in the horizontal cross-traffic position. Beneath that cross-traffic position a pit 1 is generally placed. The pit for the vehicle restraint is at a lower depth but still above the driveway level.

Figure 11:
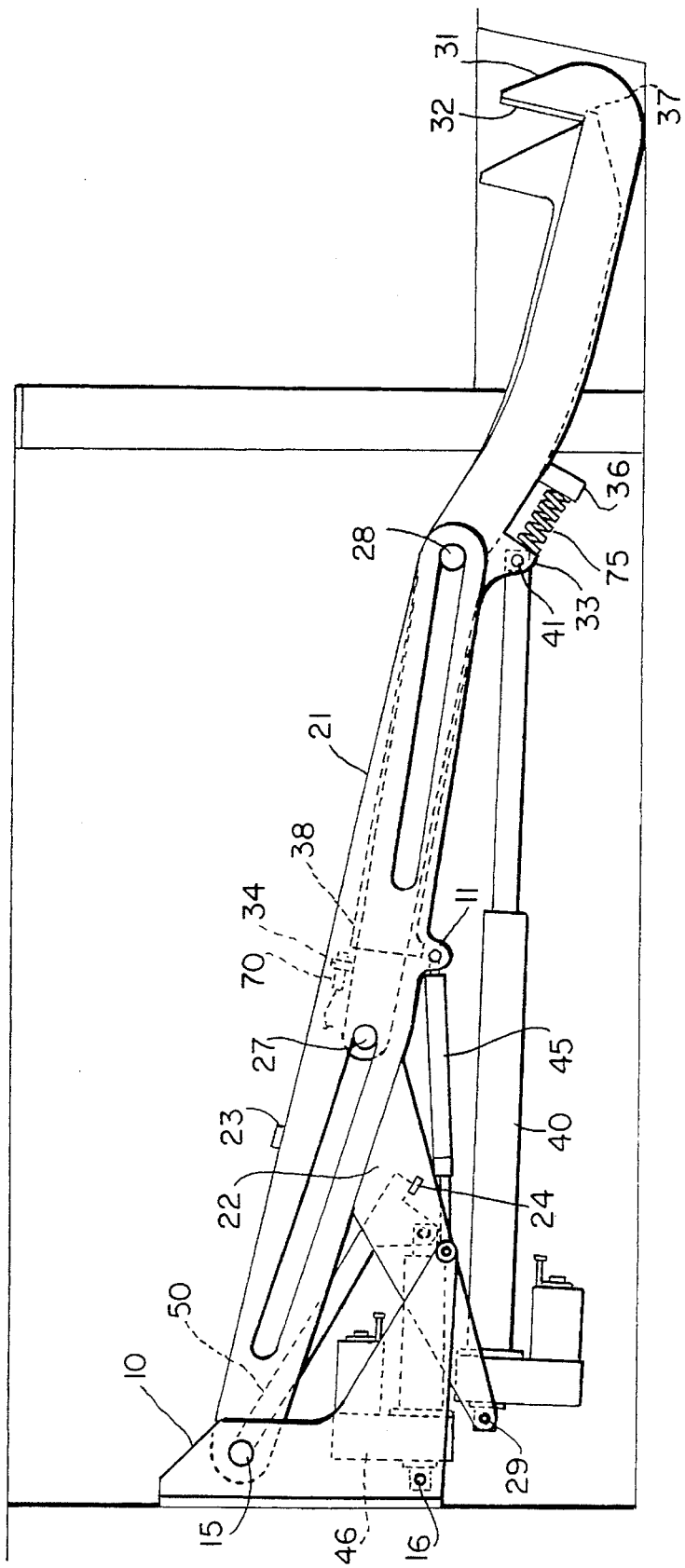
FIG. 11 illustrates in a side view an alternate mounting of the unit for vehicles with reduced clearance.

Alternatively, in order to provide a means to have the unit engage a vehicle with a very low ICC bar, it is possible to recess the pit 6 below driveway level. As illustrated in FIG. 11 this will allow the hook assembly to extend with the top of the hooks below the driveway surface. Such is important in situations where the vehicle has a very low ICC bar.

Figure 4:
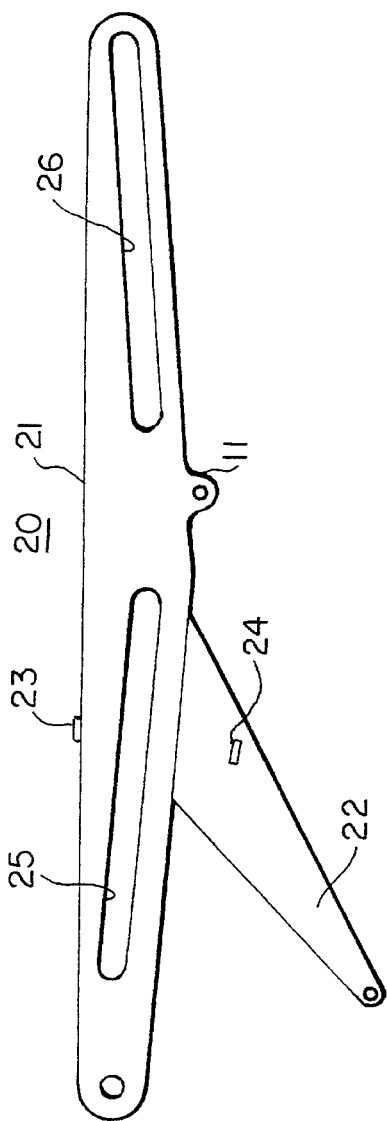
FIG. 4 is a side view of the arm assembly of the vehicle restraint of this invention.

The vehicle restraint comprises a frame assembly 10 having a back plate 12 mounted to the rear wall of the pit. An arm assembly 20 is illustrated in FIGS. 1 and 4. It comprises two side plates 21, two actuator plates 22 and cross members 23 and 24. The cross members 23 and 24 tie the two actuator support plates to each other.

The arm side plates 21 have two elongated holes 25 and 26, as illustrated in FIG. 4.

The arm assembly 20 pivots on a pin 15, which passes through holes in the frame side plates 10. The arm assembly 20 also has a mounting point 33 for an actuator 40, to be discussed in greater detail herein.

Figure 2:
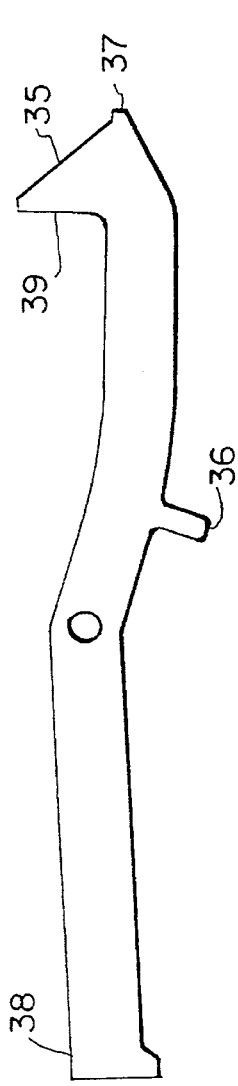
FIG. 2 is a side view of one of the hook elements used in the vehicle restraint of the invention.
Figure 3:
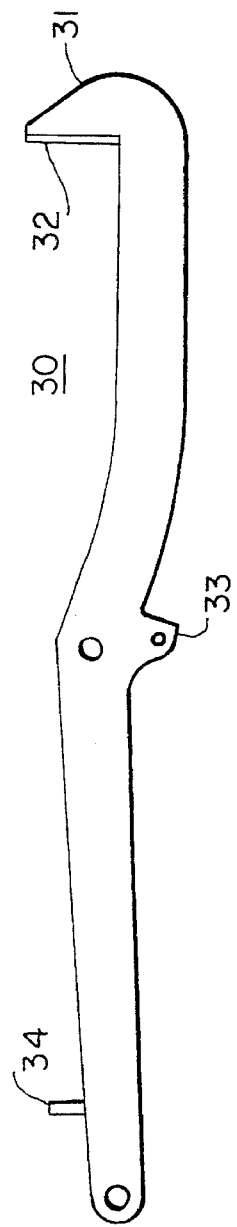
FIG. 3 is a side view of the other extensible hook element used in accordance with this invention.

The main hook assembly 30 is illustrated in FIG. 3 and comprises two hook plates 31 having a vertical plate 32 which ties the hook plates together. A secondary hook 35 is illustrated in FIG. 2 and is placed between the hook plates 31. Pins 27 and 28 illustrated in FIG. 1, pass through holes in the hook plates 31. They are then fixed for limited motion in the elongated holes 25 and 26 of the arm assembly 20. Pin 27 carries the main hook assembly 30 while pin 28 carries both the main hook arm assembly 30 and the secondary hook arm 35.

Referring back to FIG. 1, a spring 75 is trapped between a lug 33 on the main hook assembly 30 and a lug 36 on the secondary hook 35. The spring causes the secondary hook 35 to pivot about the pin 28 and to be biased upward until the tab 37 at the free end engages the plate 32 on the main hook assembly 30. This relationship, with the hooks substantially aligned, is shown in FIG. 1. As illustrated in FIG. 1, the upper surface of the arm of hook 35 is slightly above the upper arm surface of the hook assembly 30.

Figure 5:
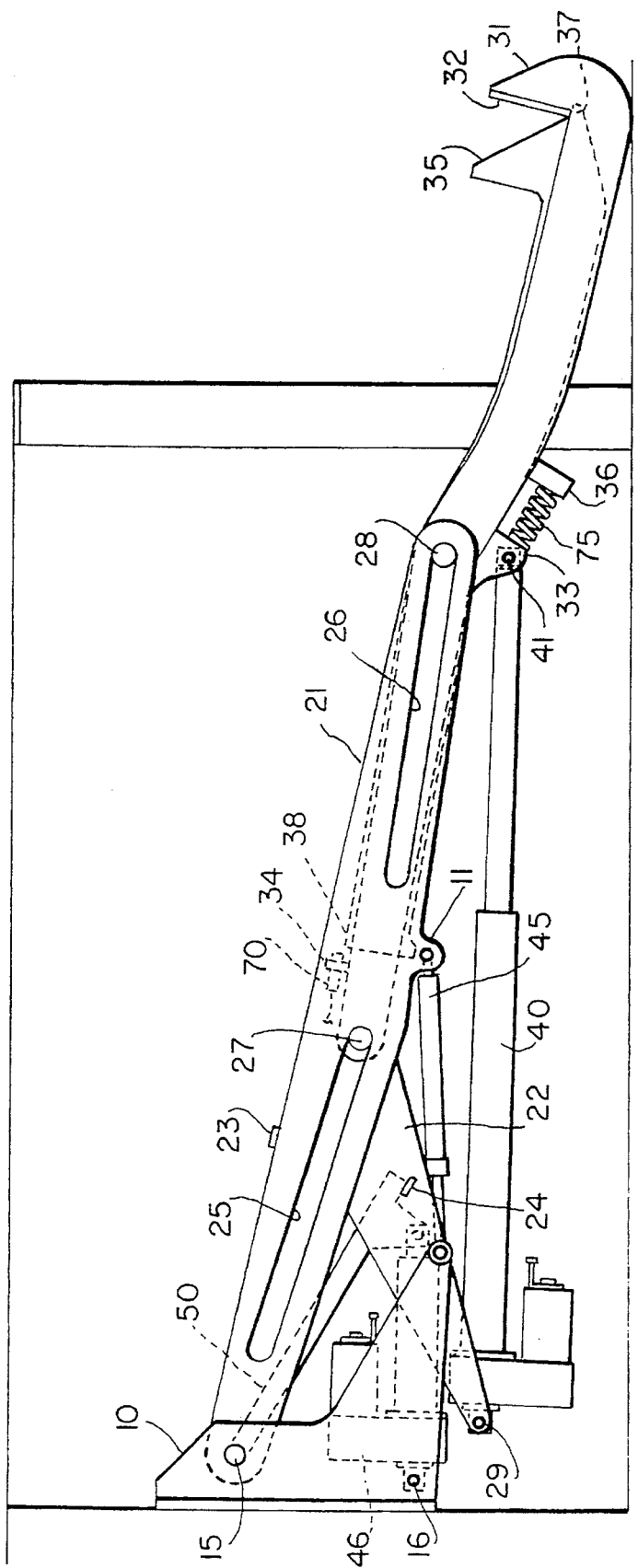
FIG. 5 is a side view illustrating extension of the hook members outward from the pit.

FIG. 5 illustrates an extended position of the hook elements prior to raising for engagement with an ICC bar. The pins 27 and 28 travel in the elongated slots 25 and 26 of the arm assembly 20 to allow for extension of the hooks 30 and 35 between the retracted position illustrated in FIG. 1 and an initial extended position illustrated in FIG. 5. The hooks are positioned by means of an electric actuator 40. FIG. 1 illustrates the actuator in its retracted position while FIG. 5 illustrates it in an extended position.

The actuator is mounted by a pin 41 which passes through the holes in the lugs 33 carried by the hook plate 31. The rear of the actuator 40 is carried by a pin 29 passing through holes in the support plates 22. The retracted and extended positions of the actuator and the hooks are sensed by limit switches (not shown) which are used to control extension and contraction of the actuator.

Figure 6:
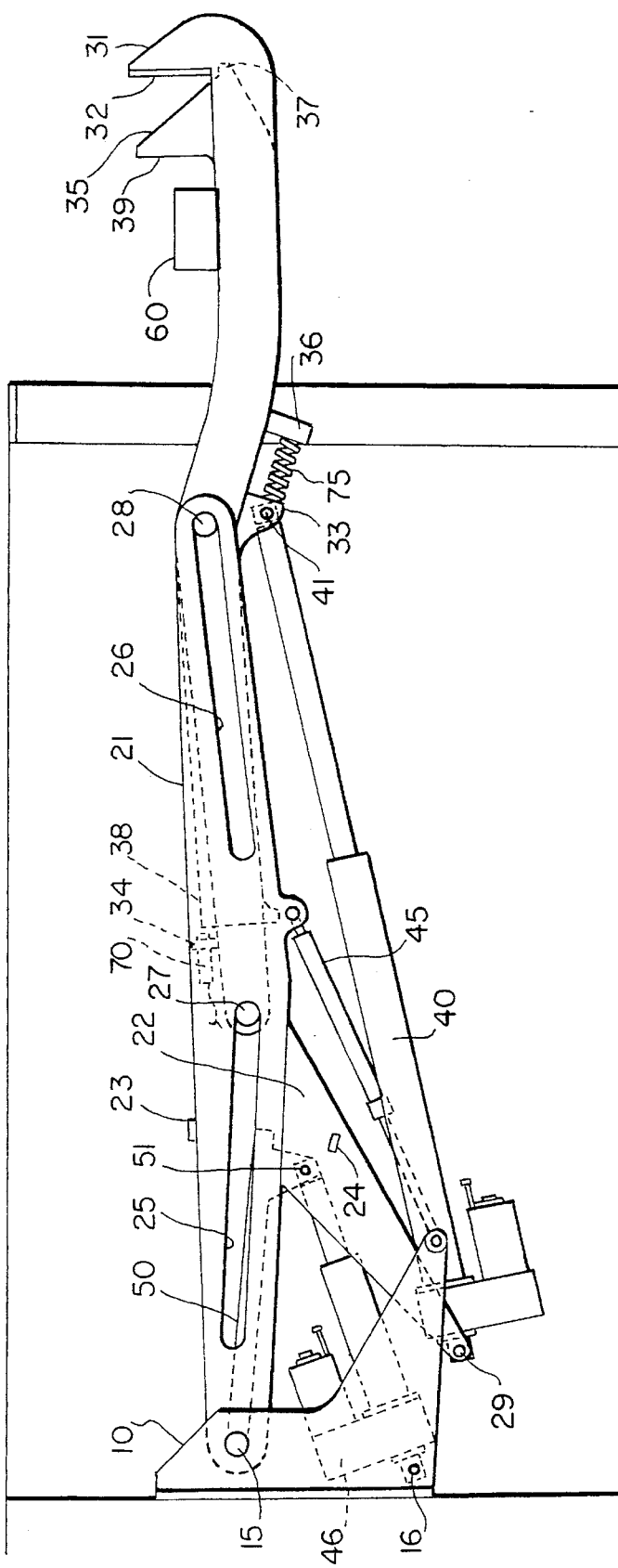
FIG. 6 is a side view similar to FIG. 5 but the hook elements have now been raised into an engagement position with a vehicle ICC bar.

The hooks 30 and 35, the actuator 40, and the arm assembly 20 all pivot as a single unit about pin 15. Referring to FIG. 6, gas springs 45 are mounted with one end attached to the frame side plates 10 with the other end attached to the arm assembly side plate 21 at the lug 11. The gas springs act to bias the hooks 31 and 35 upward to engage an ICC bar 60 illustrated in FIG. 6.

An actuating arm 50 pivots on pin 15. An electric actuator 46 is mounted on a pin 16 on the frame assembly 10 and on a pin 51 on the arm 50. When the actuator 46 is fully retracted, as illustrated in FIGS. 1 and 5, the end of the arm 50 bears on cross member 24 of the arm assembly 20. This forces the hooks down to their lowered position overcoming the upward bias provided by the gas springs 45. When the actuator 46 is fully extended as illustrated in FIG. 6 the arm assembly 20 and the hooks 30 and 35 are free to move upward and engage the ICC bar 60. This upward movement is strictly a function of the gas springs 45 with the entire unit now "floating as a function of that gas spring bias force".

When the ICC bar 60 is engaged, the secondary hook 35 is partially depressed by the ICC bar because of the slight projection of the upper arm surface of the hook 35 relative to hook assembly 30 as shown in FIG. 1. That is, the ICC bar 60 depresses hook 35 until both upper hook arm surfaces contact the ICC bar as illustrated in FIG. 6. As a result of the distal end of the hook 35 being slightly depressed, the rear extension 38 of the hook 35 is pivoted upward to enable a limit switch 70 carried on a bracket 34 on the main hook assembly 30. The limit switch signal is used by an electric controller (not shown) to display the status of the vehicle restraint to the operator. Thus, by movement of the secondary hook engagement with the ICC bar can be determined.

Referring now to FIG. 7, a top view of the vehicle restraint is depicted. FIG. 7 illustrates the nesting of the hooks 31 and 35 within the arm assembly 20. Hook element 35 is innermost surrounded by the two hook elements 31 of the hook assembly 30. In turn, those 3 hook elements nest within the arms 21 of the arm assembly 20.

The top view, FIG. 7, also illustrates the front panel assembly 60. This panel assembly comprises an upper bar 61, a lower bar 62, four vertical angles 63, and two panels 64. FIG. 8 also illustrates that front panel assembly. A channel assembly 65 is mounted in the floor of the pit and comprises a channel 66 and four pins 67. This is illustrated in FIG. 8. The bottom bar 62 has holes which fit over pin 67 to secure the bottom of the panel assembly. The top of the panel assembly 60 is secured by two bolts 68 (FIG. 8) which fasten to lugs 69 attached to the pit walls. The top of the pit is closed by a cover panel 71 which prevents debris from falling into the pit. Two of the vertical angles 63 are used to provide a space through which the hook assembly 30 can pass. They also act as guides for the hook assembly.

In operation, the vehicle restraint is generally controlled by an electrical control panel, not illustrated. The extent of travel of the actuators can be sensed by limit switches, also not shown. To engage an ICC bar 60, the actuator 40 extends the hooks 31 and 35 from the retracted position illustrated in FIG. 1 to the extended position illustrated in FIG. 5. The actuator 46 then extends to allow the springs 45 to raise the hooks to engage the ICC bar as illustrated in FIG. 6.

The limit switch 70 mounted on a plate 34, which is attached to the hook assembly 30, is used to determine whether the hooks have engaged the ICC bar. If the ICC bar is close to the dock face, the ICC bar 60 will depress the secondary hook 35 slightly, as illustrated in FIG. 6. The rear extension 38 of the hook 35 thus raises to engage limit switch 70. This provides an indication that the hook has properly engaged the ICC bar. The ICC bar can then move forward only as far as the upright surface 39 on the hook 35. This "capture" by the secondary hook 35 minimizes the travel of the ICC bar 60 and therefore the vehicle away from the loading dock.

Figure 9:
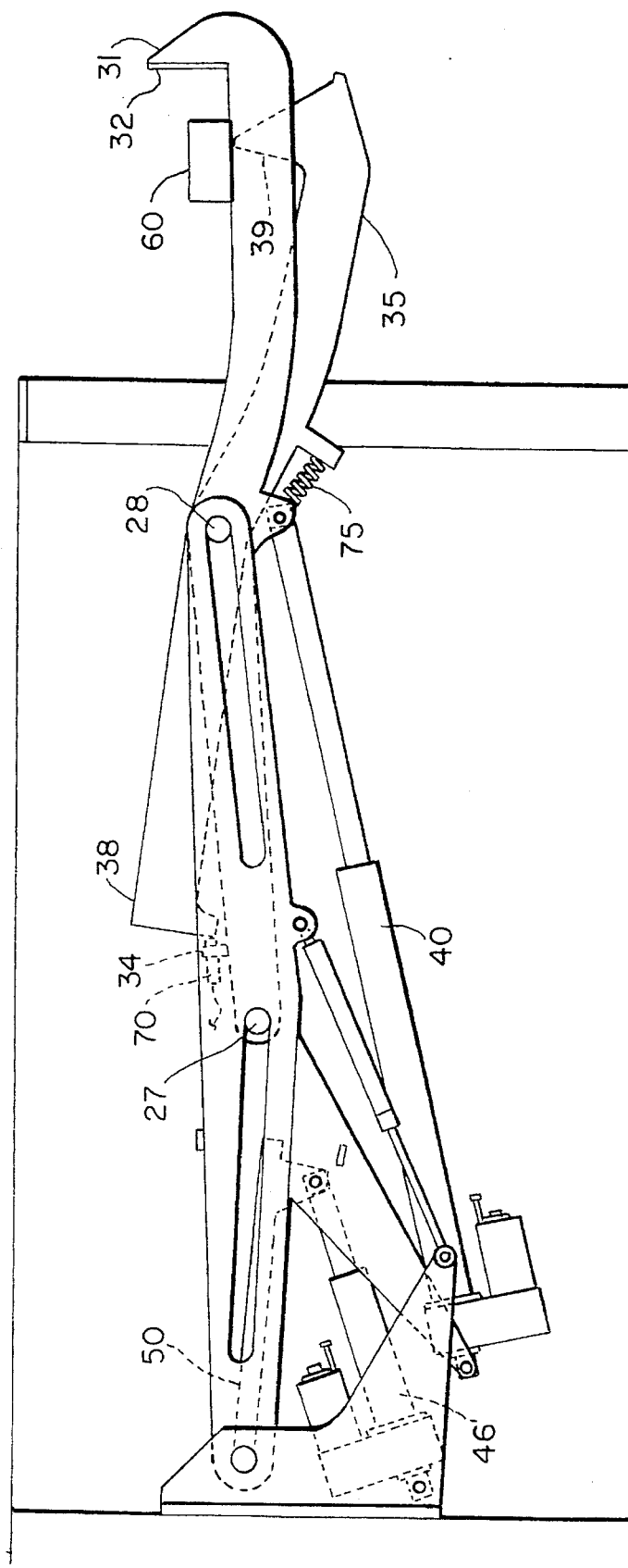
FIG. 9 is a side view similar to that of FIG. 6 but showing engagement at one hook element as the vehicle ICC bar depresses the other hook element.

If the ICC bar is positioned farther from the dock face as illustrated in FIG. 9, the secondary hook 35 will be fully depressed by contact of the ICC bar 60 on the upper tip of the hook 35. The secondary hook 35 will depress to allow the hook 30 to engage the bar. The rear extension 38 of the hook 35 will still engage the limit switch 70 to indicate proper engagement of the bar. If the ICC bar is positioned as illustrated in FIG. 9, the vehicle can move outward away from the dock face only until it engages the upright surface 32 on the hook element 31. Those two hook elements will thus limit any further forward motion of the ICC bar as a function of location of the ICC bar 60 relative to the upright surfaces 32 and 39.

To release the unit the actuator 46 retracts. This pulls the arm 50 down against the cross member 24 of the arm assembly 20. The result is that the hook is lowered to the ground, as illustrated in FIG. 5. The actuator 40 then retracts pulling the hooks into the pit as illustrated in FIG. 1.

Figure 10:
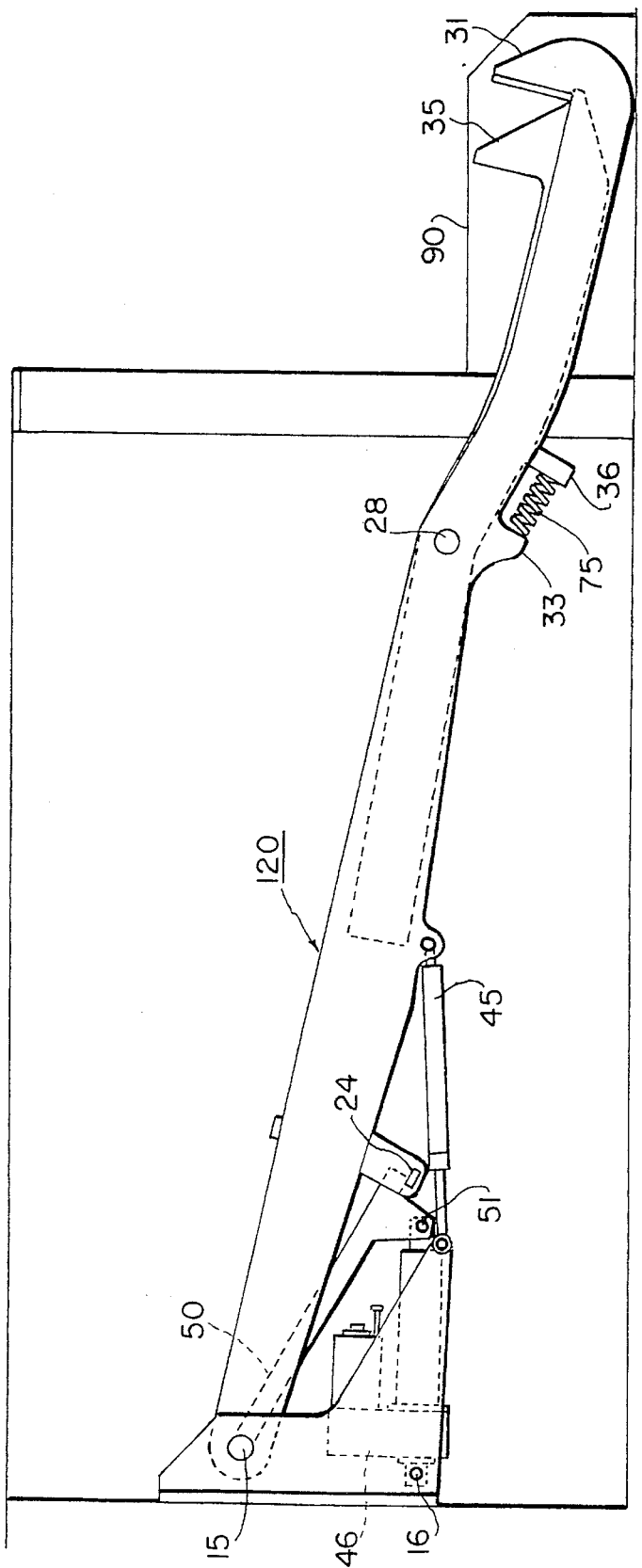
FIG. 10 illustrates in a side view a simplified embodiment with non-retractable hooks and a low-profile housing.

FIG. 10 illustrates a modification of the system constituting a second preferred embodiment. In this embodiment fixed rather than retractable hooks are employed. It permits a simplification by having the hook elements 31 and 35 not required to extend on the arm assembly 120. Rather, a single pivot point 28 exists with the entire unit pivoting on element 15 as in the first embodiment. Although it does not keep the driveway totally free of obstruction, it retains several of the benefits of the second embodiment. Most of the mechanism is placed in the pit beneath the dock leveler to be protected from weather and physical impact, and the hooks are stored in a housing 90 which is much smaller and lower than that of any vehicle restraint mounted to the face of the dock. This configuration is also well suited to use with a pit recessed below the driveway as illustrated in FIG. 11.

It is apparent that modifications of this invention can be practiced without departing from the essential scope thereof.

Having described my invention, I claim:

1. A vehicle restraint used in a dock to restrain a parked vehicle during dock operations comprising:

a frame mounted below the level of the dock; an arm assembly mounted to said frame for pivoting motion;

a hook assembly having multiple independently moving hook elements each mounted on said arm assembly and extending outward from said frame;

a first actuator mounted to said frame and engaging said arm assembly to drive said arm assembly and said hook assembly to an inoperative position where said hook assembly will not engage a vehicle, and a second actuator mounted to said first actuator and said arm assembly to provide a constant upward bias tending to pivot said arm assembly and said hook assembly upward from said inoperative position to an operative position where at least one of said multiple independently moving hook elements will engage a vehicle and restrain movement away from said loading dock.

2. A vehicle restraint as defined in claim 1 further comprising a third actuator mounted on said arm assembly and coupled to said hook assembly to extend said hook assembly in a direction outward from said arm assembly.

3. A vehicle restraint as defined in claim 2, wherein said arm assembly comprises an arm member having an elongated slot, said hook assembly having a pin slidably mounted in said slot to permit extension of said hook assembly from said arm assembly.

4. A vehicle assembly as defined in claim 1 wherein said hook assembly comprises a primary hook and a secondary hook, said primary hook and said secondary hook having staggered hook positions.

5. A vehicle restraint as claimed in claim 4 wherein said primary hook comprises a pair of hook elements and said secondary hook is positioned between said pair of hook elements.

6. A vehicle restraint as claimed in claim 5, wherein said arm assembly comprises a pair of arm elements, and said hook elements and said secondary hook are positioned between said pair of arm elements.

7. A vehicle restraint as claimed in claim 4, further comprising means to permit said secondary hook to pivot relative to said primary hook.

8. A vehicle restraint as claimed in claim 7, further comprising a sensor responsive to pivoting of said secondary hook to generate a signal indicating engagement of said restraint with a vehicle.

9. A vehicle restraint as claimed in claim 1, further comprising a housing to enclose said restraint, said housing having an opening on a front face to permit said hook assembly to extend therethrough.

10. A vehicle restraint as claimed in claim 1 further comprising a housing to enclose a portion of said hook assembly that protrudes beyond a dock face.

11. Apparatus used in a loading dock for loading or unloading a vehicle and for restraining a parked vehicle during such operations comprising:

a dock leveler mounted at said loading dock, said dock leveler having a deck and a pivotably attached lip, a pit positioned below said dock leveler;

a frame mounted in said pit;

an arm assembly mounted to said frame for pivoting motion;

a hook assembly having multiple independently moving hook elements each mounted on said arm assembly and extending outward from said frame;

a first actuator mounted to said frame and engaging said arm assembly to drive said arm assembly and said hook assembly to an inoperative position where said hook assembly will not engage a vehicle, and a second actuator mounted to said first actuator and said arm assembly to provide a constant upward bias tending to pivot said arm assembly and said hook assembly upward from said inoperative position to an operative position where at least one of said multiple independently moving hook elements will engage a vehicle and restrain movement away from said dock leveler.

12. Apparatus as defined in claim 11 further comprising a third actuator mounted on said arm assembly and coupled to said hook assembly to extend said hook assembly in a direction outward from said arm assembly.

13. Apparatus as defined in claim 12, wherein said arm assembly comprises an arm member having an elongated slot, said hook assembly having a pin slidably mounted in said slot to permit extension of said hook assembly from said arm assembly.

14. Apparatus as defined in claim 11 wherein said hook assembly comprises a primary hook and a secondary hook, said primary hook and said secondary hook having staggered hook positions.

15. Apparatus as claimed in claim 14 wherein said primary hook comprises a pair of hook elements and said secondary hook is positioned between said pair of hook elements.

16. Apparatus as claimed in claim 15, wherein said arm assembly comprises a pair of arm elements, and said hook elements and said secondary hook are positioned between said pair of arm elements.

17. Apparatus as claimed in claim 14, further comprising means to permit said secondary hook to pivot relative to said primary hook.

18. Apparatus as claimed in claim 17, further comprising a sensor responsive to pivoting of said secondary hook to generate a signal indicating engagement of said restraint with a vehicle.

19. Apparatus as claimed in claim 11, further comprising a housing to enclose said restraint, said housing having an opening on a front face to permit said hook assembly to extend therethrough.

20. Apparatus as claimed in claim 11 further comprising a housing to enclose a portion of said hook assembly that protrudes beyond a dock face.

* * * * *